United States Patent
T'Siobbel

(10) Patent No.: US 9,134,429 B2
(45) Date of Patent: Sep. 15, 2015

(54) POSITIONING DEVICE, METHOD AND PROGRAM WITH ABSOLUTE POSITIONING AND RELATIVE POSITIONING MODES

(75) Inventor: Stephen T'Siobbel, Merelbeke (BE)

(73) Assignee: TOMTOM INTERNATIONAL B.V., Amsterdam (NL)

( * ) Notice: Subject to any disclaimer, the term of this patent is extended or adjusted under 35 U.S.C. 154(b) by 754 days.

(21) Appl. No.: 13/400,838

(22) Filed: Feb. 21, 2012

(65) Prior Publication Data

US 2012/0283947 A1    Nov. 8, 2012

Related U.S. Application Data

(63) Continuation of application No. 12/451,634, filed as application No. PCT/NL2007/050246 on May 24, 2007, now abandoned.

(51) Int. Cl.
| | |
|---|---|
| *G01S 19/49* | (2010.01) |
| *G01S 19/22* | (2010.01) |
| *G01C 21/16* | (2006.01) |
| *G01C 21/30* | (2006.01) |
| *G01S 5/02* | (2010.01) |

(52) U.S. Cl.
CPC ............... *G01S 19/49* (2013.01); *G01C 21/165* (2013.01); *G01C 21/30* (2013.01); *G01S 5/0263* (2013.01); *G01S 19/22* (2013.01)

(58) Field of Classification Search
CPC ......... G01S 19/49; G01S 19/45; G01S 19/47; G01S 19/48; G01S 19/22
USPC ............... 342/357.28, 357.3, 357.31, 357.32, 342/357.61
See application file for complete search history.

(56) References Cited

U.S. PATENT DOCUMENTS

| | | | |
|---|---|---|---|
| 4,949,268 A | | 8/1990 | Nishikawa et al. |
| 5,257,195 A | * | 10/1993 | Hirata ............................ 701/472 |
| 5,311,195 A | * | 5/1994 | Mathis et al. ............. 342/357.29 |

(Continued)

FOREIGN PATENT DOCUMENTS

| | | |
|---|---|---|
| FR | 2805609 A1 | 8/2001 |
| JP | 10-079679 A | 3/1989 |

(Continued)

OTHER PUBLICATIONS

"Navstar GPS User Equipment Introduction", Public Release Version, Sep. 1996.*

(Continued)

*Primary Examiner* — Cassie Galt

(57) ABSTRACT

The invention relates to a positioning device (PD) arranged to determine a position using an absolute positioning system and a relative positioning system. The positioning device is arranged to work in a first mode, in which the position is determined using the absolute positioning system and possibly the relative positioning system, and in a second mode, in which the position is determined using the relative positioning system and possibly the absolute positioning system. In the first mode the absolute positioning system being weighted more heavily than in the second mode and the positioning device is arranged to switch from the first to the second mode. The positioning device (PD) has access to a digital map database (DMD, 3DMD) and the switch from the first to the second mode is decided based on at least the determined position in combination with information stored in the digital map database (DMD, 3DMD).

19 Claims, 3 Drawing Sheets

(56) References Cited

U.S. PATENT DOCUMENTS

| | | |
|---|---|---|
| 5,394,333 A | 2/1995 | Kao |
| 6,038,510 A | 3/2000 | Lee |
| 6,545,638 B2 * | 4/2003 | Sladen .................... 342/357.32 |
| 6,801,159 B2 | 10/2004 | Swope et al. |
| 2006/0080036 A1 * | 4/2006 | Stefan .......................... 701/300 |
| 2006/0189324 A1 | 8/2006 | Anderson |
| 2007/0005243 A1 | 1/2007 | Horvitz et al. |
| 2008/0238772 A1 | 10/2008 | Soloviev et al. |
| 2008/0262728 A1 * | 10/2008 | Lokshin et al. ............... 701/216 |

FOREIGN PATENT DOCUMENTS

| | | |
|---|---|---|
| JP | 2001-272451 A | 10/2001 |
| JP | 2003-254759 A | 9/2003 |
| JP | 2006-010634 A | 1/2006 |
| JP | 2008-032604 A | 2/2008 |

OTHER PUBLICATIONS

International Search Report issued Feb. 18, 2008 for International Application No. PCT/NL2007/050246.

* cited by examiner

POSITIONING DEVICE, METHOD AND PROGRAM WITH ABSOLUTE POSITIONING AND RELATIVE POSITIONING MODES

CROSS-REFERENCE TO RELATED APPLICATION

This is a continuation application of Ser. No. 12/451,634, filed Jan. 19, 2010, now abandoned and entitled "Positioning Device and Method to Determine a Position Using an Absolute Positioning System and a Relative Positioning System, Computer Program and a Data Carrier", which is the 35 U.S.C. 371 national stage of PCT/NL2007/050246, filed May 24, 2007 and entitled "Positioning Device and Method to Determine a Position Using an Absolute Positioning System and a Relative Positioning System, Computer Program and a Data Carrier", the disclosure of which is incorporated by reference herein in its entirety as if set forth at length.

TECHNICAL FIELD

The present invention relates to a positioning device and method to determine a position using an absolute positioning system and a relative positioning system, a computer program and a data carrier.

BACKGROUND

Global Navigation Satellite Systems (GNSS), such as the global positioning system (GPS-system) are used worldwide by users to determine their position (longitude, latitude, altitude) on earth.

The GPS-system comprises a number of satellites orbiting the earth, each satellite transmitting radio signals comprising precise timing information about the time the radio signals are transmitted by the satellite. The radio signals also comprise position information (orbital information) comprising information about the position of the respective satellite, and a satellite identification that is unique for a specific satellite.

Positioning devices, such as GPS-receivers, are arranged to receive these signals and compute their position based on the received signals. Such positioning devices provide absolute positioning information with respect to an absolute frame of reference and may therefore also be referred to as absolute positioning systems.

Positioning devices are arranged to receive these transmitted radio signals and compute the travel time of such a radio signal based on the timing information comprised by the radio signal and a measured time of arrival of the radio signal using a clock comprised by the positioning device. The travel time is usually 65-85 milliseconds. Based on the travel time, the distance of the positioning device to the satellite can be computed, simply by multiplying the travel time with the speed of light (c=299.792.458 m/s).

Based on the received orbital information comprised by the radio signal, the positioning device can compute the position of the satellite. By combining the information of the distance to the satellite and the position of the satellite, the positioning device is placed on an imaginary sphere whose radius equals the distance and whose centre is the satellite.

By repeating this computation process for at least four satellites, the positioning device can compute four of such imaginary spheres, defining one intersection, which defines the position of the positioning device.

Positioning devices are often used in navigation devices comprising digital map data. Such navigation devices may be arranged to show the position as determined on the digital map using a display. Such a navigation device may be referred to as a map displaying device, where the part of the displayed map is determined by the actual position as determined by the positioning device.

Also, such navigation devices may be arranged to compute navigation instructions from a start position (for instance the current position) to a destination position, to guide the user to the destination address. Since the positioning device is able to position the current position on the digital map, the navigation device is capable of providing detailed navigation instructions, such as: "after 100 meters, turn left". It will be understood that accurate positional information is needed for such applications in order to ensure optimal navigation and optimal user comfort.

In order to increase the accuracy of the position as determined by the positioning device using the absolute positioning system, the positioning device may use more than four satellites. Generally, a positioning device uses information from all satellites from which it receives radio signals. In general, the more satellites are used, the more accurate the determined position.

The accuracy of the position as determined by the positioning device is influenced by a number of factors, such as the computed position of the satellite, the computed travel time of the radio signal, the current time as determined by the clock of the positioning device. A number of techniques are known to decrease the effect of these system errors, such as WAAS (Wide Area Augmentation System) and DGPS (differential GPS), as will be known to a skilled person.

The accuracy of the determined position may be further increased by using a technique called map matching. This technique introduced a further increase in the accuracy of the determined position, by mapping the position as determined to a street or the like as stored in the map database.

However, also a number of further outside errors can be identified reducing the accuracy of the determined position, such as ionospheric effects, errors of the satellite clocks etc. One special type of error is so-called multi-path distortion.

Multi-path occurs in situations in which the radio signal as transmitted by a satellite is reflected by an object, such as a building, and the positioning device receives the radio signal after reflection, possibly together with a not-reflected radio signal. As a result, the computed distance between the satellite and the positioning device introduces an error in the computed position of the positioning device.

Positioning devices may also comprise or interact with a relative positioning system to generally improve the positioning accuracy of the absolute positioning system or to determine a position in situations in which no or not enough radio signals can be received. Relative positioning systems provide local and relative positioning information.

These relative positioning systems may for instance be at least one of a gyroscope, an accelerometer, a compass, a distance meter (such as an odometer), an inclinometer. In case the positioning device is used in a vehicle, such as a car or motor cycle, the relative positioning device may also be a distance/velocity measurement module as usually present in such a vehicle and/or a module detecting steering actions of a steering wheel and/or other sensors that may be present in the vehicle.

Situations in which more emphasis may be put on the relative positioning systems (i.e. information from the relative position system is weighted more heavily), are for instance when the positioning device enters a tunnel or an underground parking. The positioning device will no longer be able to determine its position using the absolute positioning system, as not enough radio signals are received. Inside the tunnel or underground parking, the positioning device uses information received from or obtained with the relative positioning system.

For instance, a gyroscope provides information about relative rotational movement. In combination with the last obtained position based on the absolute positioning system and the distance meter, this may be used to compute a current position within the tunnel or underground parking.

U.S. Pat. No. 5,311,195 describes a navigation system using a combination of an absolute positioning system, such as a GPS-receiver and a relative positioning system, such as an onboard wheel sensor and/or an magnetic compass. According to U.S. Pat. No. 5,311,195 the position as determined by the relative positioning system is updated by the position as determined by the absolute positioning system in case a contour of equal probability of a position determined by the relative positioning system overlaps a contour of equal probability of a position determined by the absolute positioning system. So, in case the accuracy of the relative positioning system is low, the absolute positioning system may be used to update the relative positioning system.

According to the prior art, positioning devices are arranged to determine a position using an absolute positioning system and a relative positioning system, and are further arranged to work
   in a first mode, in which the position is determined using the absolute positioning system and possibly the relative positioning system, and
   in a second mode, in which the position is determined using the relative positioning system and possibly the absolute positioning system,
   where in the first mode the absolute positioning system is weighted more heavily to determine the position than in the second mode. The positioning devices are arranged to switch from the first mode to the second mode and vice versa, based on determined accuracies of the absolute and/or relative positioning systems.

Based on the above, it is an object to provide a positioning device and method that provides more accurate positional information.

SUMMARY

According to an aspect there is provided a positioning device arranged to determine a position using an absolute positioning system and a relative positioning system, and further arranged to work
   in a first mode, in which the position is determined using the absolute positioning system and possibly the relative positioning system, and
   in a second mode, in which the position is determined using the relative positioning system and possibly the absolute positioning system,
   in the first mode the absolute positioning system being weighted more heavily than in the second mode to determine the position and the positioning device is arranged to switch from the first mode to the second mode, characterized in that the positioning device comprises or has access to a digital map database, and the switch from the first to the second mode is decided based on at least the determined position in combination with information stored in the digital map database. Such a positioning device provides a more accurate determination of the position, as the switch from one mode to another mode may be made before the quality of the one mode has deteriorated too much.

According to an embodiment the absolute positioning system is one of a satellite based positioning system and a terrestrial positioning system.

According to an embodiment the relative positioning system is at least one of a gyroscope, an accelerometer, a compass, a velocity measurement module, a distance meter, an inclinometer and a module detecting steering actions of a steering wheel.

According to an embodiment, the information stored in the digital map database comprises a plurality of geographical objects having threshold distances associated with them.

According to an embodiment the positioning device is arranged to compute at least one distance from the determined position to a selection of the plurality of geographical objects having threshold distances associated with them and the switch from the first to the second mode is made if at least one of the computed distances is below the respective associated threshold.

According to an embodiment the absolute positioning system is arranged to determine a position based on signals received from a plurality of transmitters being part of the satellite based positioning system or the terrestrial positioning system.

According to an embodiment the digital map database is a three dimensional digital map database, and the information comprises three dimensional information about geographical objects, wherein the positioning device is arranged to compute a quality of a position as determined by the absolute positioning system based on at least one of the determined position, the position of the transmitters and the three dimensional digital map database.

According to an embodiment the positioning device is arranged to determine the respective positions of the transmitters based on position information comprised by the respective signals.

According to an embodiment a further switch from the second to the first mode is decided based on a determined position in combination with information stored in the digital map database.

According to an embodiment the positioning device is arranged to keep a history file comprising previously determined positions and associated accuracies as determined according to the absolute positioning system and, when a switch is made from the first mode to the second mode, the positioning device is arranged to select a starting position for the relative positioning system from the history file.

According to an embodiment the positioning device is arranged to determine accuracies of determined positions in one mode, compare the determined accuracy of positions with a threshold value and in case the accuracy is below the threshold value, store these positions as a geographical object with an advised mode associated with it, the advised mode being different from the one mode.

According to an aspect there is provided a method, the method comprises determining a position using an absolute positioning system and a relative positioning system, the position can be determined
   in a first mode, in which the position is determined using the absolute positioning system and possibly the relative positioning system, and
   in a second mode, in which the position is determined using the relative positioning system and possibly the absolute positioning system,
   in the first mode the absolute positioning system being weighted more heavily to determine the position than in the second mode and the method further comprising switching from the first mode to the second mode, characterized in that the method comprises an action to decide whether or not to switch from the first mode to the second mode based the determined position in combination with information stored in a digital map database.

According to an aspect, there is provided a computer program, that when loaded on a computer arrangement, is arranged to perform any one of the methods according to the above.

According to an aspect, there is provided a data carrier, comprising a computer program according to the above.

BRIEF DESCRIPTION OF THE DRAWINGS

The present invention will now be discussed in more detail using a number of exemplary embodiments, with reference to the drawings, which are only intended to illustrate the present invention and not to limit its scope which is only limited by the appended claims:

DETAILED DESCRIPTION

As already briefly described above, the positioning device may be arranged to work in a first mode, in which positions are determined using an absolute positioning system, and a second mode, in which positions are determined using a relative positioning system. Such a positioning device may comprise a processing unit PU comprising or interacting with such an absolute and relative positioning system. The processing unit PU may also be arranged to switch from the first to the second mode and vice versa. First the processing unit PU of such a positioning device is described in more detail.

Processing Unit

Figure 1:
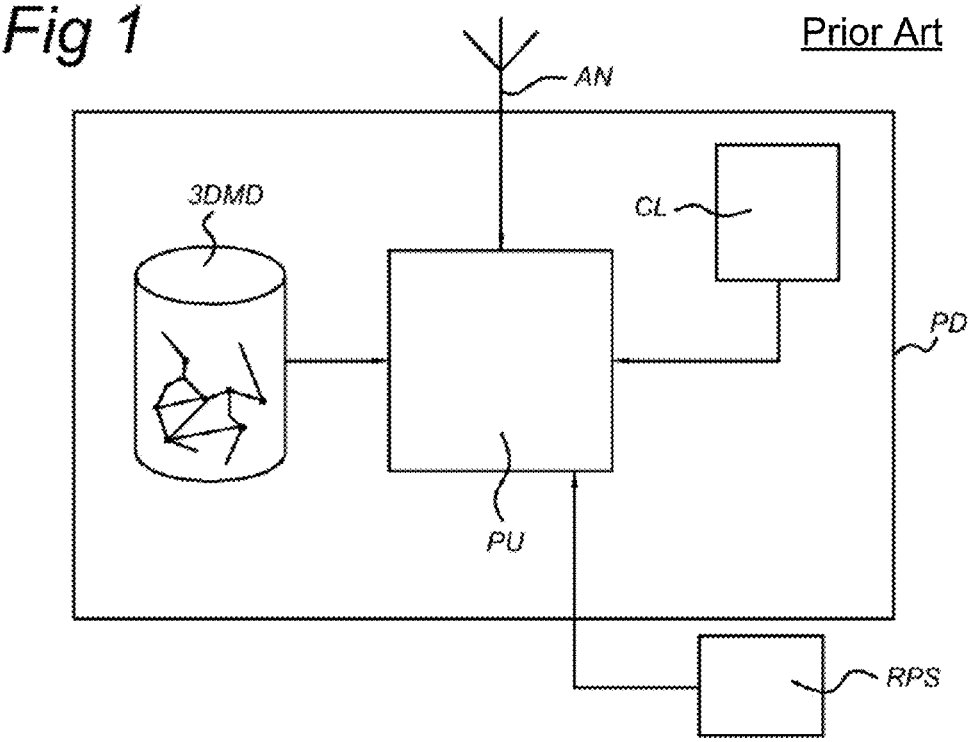
FIG. 1 schematically depicts a positioning device according to the prior art.

The processing unit PU is shown schematically in FIG. 1, but it will be understood that the processing unit PU may be formed as a computer unit, for instance comprising a processor for performing arithmetical operations and memory, the memory comprising programming lines readable and executable by the processor to provide the positioning device PD with the functionality described here.

The memory may be a tape unit, hard disk, a Read Only Memory (ROM), Electrically Erasable Programmable Read Only Memory (EEPROM) and a Random Access Memory (RAM).

The processing unit PU may further comprise or be arranged to communicate with input devices, such as a keyboard, a mouse, a touch screen, a speaker,
  output devices, such as a display, a printer,
  reading devices to read data carriers, such as for instance floppy disks, CD ROM's, DVD's FLASH cards, USB-sticks and the like and
  communication devices arranged to communicate with other computer systems via a communication network, such as via a mobile telephone network, a GSM-network, a UMTS-network, a RF-network, (wireless) Internet etc.

The processing unit PU may be arranged to receive information from a relative positioning system (also referred to as autonomous positioning system) as explained in more detail below using suitable input devices or reading devices.

However, it should be understood that there may be provided more and/or other memories, input devices, output devices and read devices known to persons skilled in the art. Moreover, one or more of them may be physically located remote from the processor unit PU, if required. The processor unit PU is shown as one box, however, it may comprise several processor units functioning in parallel or controlled by one main processor unit that may be located remote from one another, as is known to persons skilled in the art.

The processing unit PU may further comprise or be arranged to communicate with a clock CL and an antenna AN. The clock CL may be used in combination with the absolute positioning system. The antenna AN may be used to receive signals from e.g. satellites of the absolute positioning system.

It is observed that, the connections between different hardware elements may be physical connections, but one or more of these connections can be made wireless.

The processing unit PU may be a computer system, but can be any signal processing system with analog and/or digital and/or software technology arranged to perform the functions discussed here.

Absolute Positioning System

Figure 2:
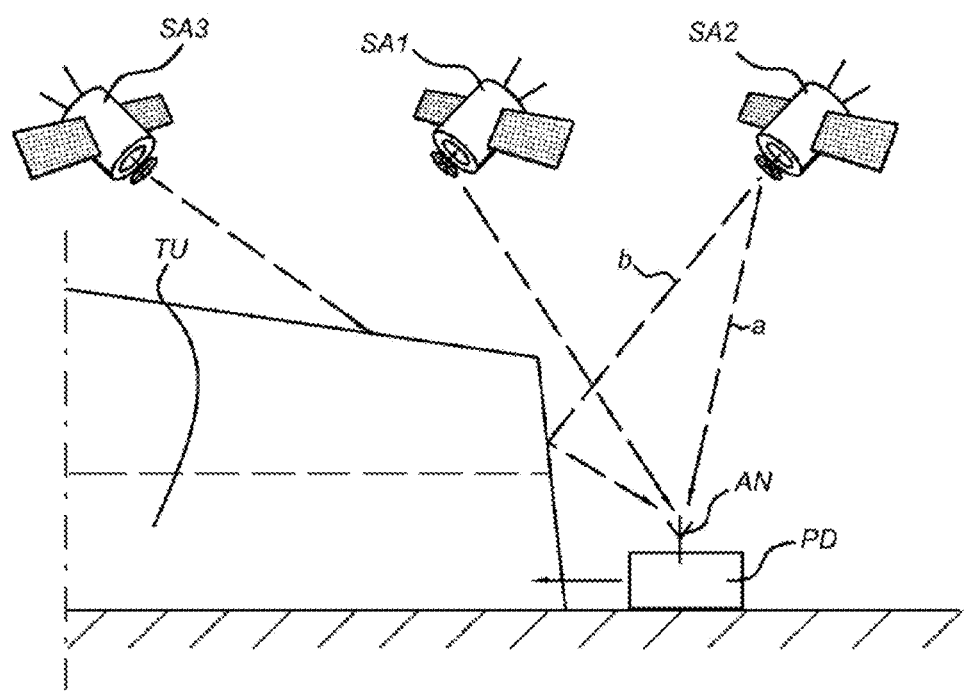
FIG. 2 schematically depicts a positioning device interacting with satellites, and FIGS. 3, 4 and 5 schematically depict flow diagrams according to embodiments.

FIG. 2 shows a positioning device PD as already described above using an absolute positioning system to determine its position. The positioning device PD comprises a processor unit PU, an antenna AN and a clock CL. The antenna AN is arranged to receive radio signals transmitted by satellites SA1, SA2 and transmit these received radio signals to the processor unit PU. Although the antenna AN is depicted as a part extending from the positioning device PD, it will be understood that the antenna AN may also be a formed inside the positioning device PD. The clock CL is arranged to provide accurate time information to the processor unit PU.

As already described above, the processor unit PU may be arranged to receive radio signals from satellites SA1, SA2 via antenna AN. From these radio signals, the processor unit PU gathers information, such as timing information about the time the radio signals were transmitted by the satellite, orbital information comprising information about the position of the respective satellite and a satellite identification of the satellite SA1, SA2.

The processor unit PU may further be arranged to determine time of arrival of radio signals, using the time information received from the clock CL. Based on the time information about the time the radio signals were transmitted by the satellite and the time information from clock CL, the processor unit PU can compute the travel time of the radio signal (subtracting one from the other), and the distance between the positioning device PD and the respective satellite (by multiplying the travel time with the speed of light).

By combining information from a number of satellites (at least four) the position of the positioning device PD can be computed.

FIG. 2 further shows that the positioning device PD is positioned near an entrance of a tunnel or underground parking. In fact, the positioning device PD may be near any kind of object that may block radio signals transmitted by a satellite, such as a building, tree, hill, mountain, viaducts etc. FIG. 2 further schematically shows a first satellite SA1, a second satellite SA2 and a third satellite SA3 orbiting the earth. It will be understood that although only three satellites SA1, SA2, SA3 are shown in FIG. 2 in fact, more than three satellites SA1, SA2, SA3 will usually be present.

The first satellite SA1 transmits radio signals, indicated with the dotted line. It can be seen that the radio signals can be detected by the positioning device PD. The processor unit PU can now compute the distance from the positioning device PD to the first satellite SA1.

The second satellite SA2 also transmits radio signals, also indicated with the dotted line. However, these radio signals suffer multi-path distortion, as the radio signal from the second satellite SA2 travels to the antenna AN of the positioning device PD directly (see radio signal a in FIG. 2) as well as indirectly (see radio signal b), i.e. via a reflection of the entrance of the tunnel TU.

If the processor unit PU now computes the distance between the positioning device PD and the second satellite SA2 by computing the travel time, it will be understood that an erroneous distance will result, because of the multi-path distortion. This erroneous distance will lead to an erroneous determined position of the positioning device PD, even when used in combination with information obtained from a plurality of satellites SA1, SA2.

Radio signals from the third satellite SA3 can not be received by the positioning device at all, as they are completely blocked by the tunnel TU.

It will be understood that the examples of the absolute positioning system described here, are not restricted to GPS-systems. The embodiments described may be used in combination with any kind of absolute positioning system using signals being sent wirelessly from a plurality of transmitters to a receiver, such as a positioning device PD, enabling the receiver to compute its position based on the received signals.

It is to be understood that such signals usually have a low power intensity which make them relatively difficult to detect for positioning devices.

The absolute positioning system may be any kind of satellite based positioning system or global navigation satellite system (GNSS), such as the GPS-system, GLONASS and Galileo.

The absolute positioning system may also be a terrestrial positioning system, using beacons positioned on land or sea that transmit signals comprising information that may be used by a receiver to determine its position. An example of such a terrestrial system is LORAN (LOng RAnge Navigation). Another example of such a system may be a terrestrial system using mobile telephone masts (such as GSM masts) as beacons.

In general the absolute positioning system comprises a plurality of transmitters, such as satellites or beacons, arranged to wirelessly transmit signals, such as radio signals, that may be received by a receiver, such as a positioning device PD that is arranged to compute its position based on the received signals.

Relative Positioning System

According to the embodiments described here, the positioning device PD may comprise or interact with a relative positioning system RPS, as schematically depicted in FIG. 1. As described above, such a relative positioning system RPS may for instance be at least one of a gyroscope, an accelerometer, a compass, a distance meter (such as an odometer), an inclinometer. In case the positioning device PD is used in a vehicle, such as a car or motor cycle, the relative positioning system RPS may also be a distance/velocity measurement module as usually present in such a vehicle and/or a module detecting steering actions of a steering wheel and/or other sensors that may be present in the vehicle.

It will be understood that also other relative positioning systems RPS may be used. Also, a combination of different relative positioning systems RPS may be used.

For instance, the positioning device PD may be arranged to receive input from a velocity measurement module and a (n electronic) compass. Based on the input received from these modules, the processor unit PU of the positioning device PD may compute a relative position, as it is able to compute how far the positioning device PD has traveled in which direction.

According to the prior art, the positioning device PD may be arranged to work
in a first mode, in which the position is determined using the absolute positioning system and possibly the relative positioning system, and
in a second mode, in which the position is determined using the relative positioning system and possibly the absolute positioning system,
where in the first mode the absolute positioning system is weighted more heavily to determine the position than in the second mode. The switch from the first mode to the second mode may be triggered by comparing estimates of accuracies of the positions as determined by both systems. Also, when no absolute position determination is possible, for instance when the positioning device PD enters a tunnel or underground parking the positioning device may shift from first to second mode.

From the above it will be clear that in the first mode and the second mode the positional information as obtained from the absolute and the relative positioning system may be combined by weighting, filtering, mixing etc. to obtain a determined position of the positioning device.

Of course, further modes may be applied, using different weighting of the absolute positioning system and the relative positioning system than in the first and second mode. Also, it will be understood that according to an embodiment, the relative positioning system is not taken into account at all in the first mode and/or the absolute positioning system is not taken into account at all in the second mode.

In the second mode, the positioning device PD uses relative positioning information provided by the relative positioning system RPS. The relative positioning information is used in combination with a starting position (e.g. the most recent position as determined by the absolute positioning system or the previous mode) to determine a current position.

However, it is identified that switching from the first to the second mode and/or vice versa, according to the prior art may result in inaccurate positioning information, as the switch is usually made on a moment in time on which the position as determined according to the initial mode is already relatively inaccurate.

For instance, an error in the starting position used by the relative positioning system RPS as determined by the first mode before switching from the first to the second mode, will effect all the subsequent positions determined in the second mode, as the starting position is used as a basis for these. Therefore, an improvement is provided to ensure that more accurate positioning information is computed.

Digital Map Database

Positioning devices PD may comprise or have access to digital map databases DMD. The positioning device PD may be arranged to show a current position on a digital map using a display. However, the positioning device PD may also be arranged to provide navigation instructions from a start position (for instance the current position) to a destination position, to guide the user to the destination address.

It will be understood that the term digital map database as used here does not necessarily refer to a database structure in the traditional way, i.e. does not imply relational structure between the database entries or a database manager coordinating the database. The digital map database as used here refers to any set of geospatial information, regardless of the exact way the information is structured.

The term geographical object as used here may correspond to a real-life object, such as a tunnel, building, tree, hill etc., but also correspond to a certain position in general.

Digital map databases DMD, also known as geospatial databases, navigation maps or electronic maps, are known in the prior art. Digital map databases DMD in common usage today may comprise geographical objects (also referred to as geographical points) related to geographic location(s) and possibly incorporate some form of geographically related information, such as points of interest (museum, restaurant), (underground) parkings, tunnels, bridges and the like. In this application, the term digital map database DMD is used to denote all kinds of electronic and digital maps.

Digital map databases DMD may comprise a set of geographical objects and a set of vectors, representing (parts of) roads, connecting geospatial objects. The digital map database DMD may further comprise additional information, for instance relating to the type of road (highway, foot path), maximum allowable speed (50 km/h, 100 km/h), street names, the presences of objects, such as tunnels and underground parkings etc. The digital map database DMD may further also comprise information about type of environment (urban, rural, forest, agriculture) and the like.

The digital map database DMD may be used to compute navigation instructions to guide a user to a destination, as mentioned above. Depending on the current position of the user as determined by the positioning device, a part of the digital map database DMD may be displayed on a display.

The digital map database may be a 3D digital map databases 3DMD, comprising three dimensional information, for instance about geographical objects such as buildings, trees, rocks, mountains, tunnels, (underground) parkings etc. The 3D digital map database 3DMD may further comprise information about urban canyons and/or city models.

Such a 3D digital map database 3DMD may comprise information about the position of objects, including the horizontal and vertical dimensions of such objects. The 3D digital map database 3DMD may also comprise information about the shape of such geographical objects, which may for instance be relevant in case of a building having a gabled roof (peaked roof).

EMBODIMENTS

According to an embodiment, the positioning device PD is arranged to switch from the first mode to the second mode using information from the digital map database DMD or 3-dimensional digital map database 3DMD.

According to a further embodiment, the positioning device PD is arranged to switch from the second mode to the first mode based on information from the digital map database DMD or 3-dimensional digital map database 3DMD.

It will be understood that the second mode may also exclusively use information from the relative positioning system and no information from the absolute positioning system. This may for instance be the case in situations where no absolute positioning is possible, for instance in a tunnel or the like. In such a case, when the positioning device PD is in the second mode, the relative positioning information as determined by the relative positioning system RPS can only be translated into an absolute position, using the starting position described above, for instance being a previously determined absolute position, determined in the first mode or by the absolute positioning system.

According to the prior art switching from the first mode to the second mode was triggered based on the identification that the quality or accuracy of the position as determined was relatively bad, for instance because less radio signals were received. However, as a result from switching from the first mode to the second mode when the determined position lacks accuracy, the starting position used as a basis for the relative position system, is of a relative low quality or is relatively inaccurate. This may for instance be the case because the switch from the first to the second mode is made on a moment that the positioning device PD already entered the tunnel TU. Therefore, all the positions determined using the relative positioning system are relatively inaccurate because of the relatively inaccurate starting position.

According to embodiments provided here, switching from the first to the second mode is done in a more sophisticated way, i.e. before the quality of the position as determined in the first mode has decreased too much. The switch from the first to the second mode is triggered by using information from the digital map database DMD or the 3-dimensional digital map database 3DMD.

Also, according to embodiments provided here, switching from the second to the first mode is done when the quality of the position as determined by the first mode is sufficiently high. The switch from the second to the first mode is triggered by using information from the digital map database DMD or the 3-dimensional digital map database 3DMD.

By using information from the digital map database, the timing of switching from one mode to another may be timed more accurately, resulting in more accurate positioning information.

Embodiment 1

According to an embodiment, the digital map database DMD may comprise a geographical object, such as the position of e.g. a tunnel TU, or the position of a tree, building, viaduct and the like. Together with this geographical object, a threshold distance may be stored in the digital map database DMD, for instance of 50 meters, indicating that the quality of the positioning in the first mode is poor within that distance from the tunnel TU and the positioning device PD should switch from the first mode to the second mode when being less than for instance 50 meters away from the tunnel TU.

Each specific geographical object may have its own threshold associated with it. Also, standard threshold distances may be provided for specific type of geographical objects, such as 50 meters for tunnels and 30 meters for trees.

According to such an embodiment, the positioning device PD may have access to the digital map database DMD. Based on the information stored in the digital map database DMD, for each position of the positioning device PD, the positioning device PD may compute if it is too close to a geographical object and the quality of the positions as determined in the first mode will probably deteriorate too much. When the positioning device PD determines it is too close to an object, the positioning device PD switches to the second mode.

Also, when the positioning device PD is in the second mode, and the positioning device PD detects that it is no longer within threshold distance from a geographical distance, it may switch back from the second mode to the first mode.

Of course, this embodiment could also work in combination with a 3-dimensional digital map database 3DMD comprising threshold distances.

Flow Diagram 1

Figure 3:
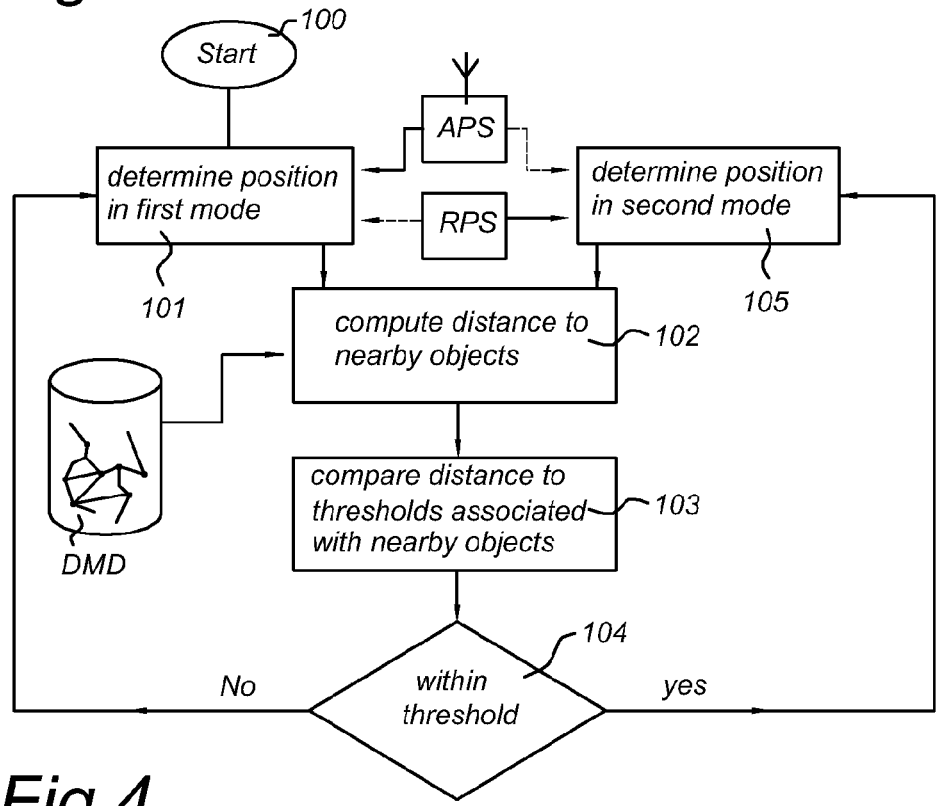

FIG. 3 schematically depicts a flow diagram depicting actions as may be performed by the positioning device PD or the processing unit PU according to an embodiment.

In a first action 100, the positioning device PD may start executing the flow diagram as described here. The start may be triggered manually by a user or may for instance be triggered by switching on the positioning device PD.

In a second action 101, the positioning device PD determines its position in the first mode, using input from the absolute positioning system APS and possibly from the relative positioning system RPS.

Once a position is determined, the positioning device PD may compute its distance to nearby geographical objects having a threshold associated with it, for instance all such geographical objects within a range of 100 meters. This is done in an action 102. For performing this action, input from the digital map database DMD is used.

In a next action 103, the computed distances to nearby geographical objects are compared with the appropriate distance thresholds, associated with the geographical objects.

If the positioning device PD is not too close to a geographical object, in action 104 it is decided to return to action 101 and determine an updated position in the first mode. If the positioning device PD is too close to a geographical object, in action 104 it is decided to proceed to action 105 and determine an updated position in the second mode.

After action 101 and 105, actions 102, 103 and 104 are executed. This ensures that the positioning device PD automatically switches from the first mode to the second mode and vice versa when necessary and possible.

Embodiment 2

According to a further embodiment, the processor unit PU may have access to a 3D digital map database 3DMD. According to such an embodiment, the positioning device PD may compute, based on the three dimensional information about geographical objects stored in the 3D digital map database 3DMD for each position of the processor unit PU if the quality of the absolute positions as determined by the absolute positioning system will be such that the processor unit PU should switch to the second mode, in which the absolute positioning system APS is weighted less heavily.

So, where the first embodiment uses predetermined threshold distances that are stored in the digital map database or the 3D digital map database, according to this embodiment, switching form one mode to the other is determined on the spot using information from the 3D digital map database.

The processor unit PU may for instance compute when it will reach or has reached a position where multi-path distortion is likely to occur. It will be understood that the processor unit PU has knowledge of the current positions of the satellites SA1, SA2, SA3 from which signals are received, as this information is comprised by the signals (orbital information). Using this information in combination with the shape and size of geographical objects close to the latest determined position, which is stored in the 3-dimensional digital map database 3DMD, the processor unit PU can compute for which satellites multi-path distortion is likely to occur by applying straightforward geometry.

According to an alternative, the processor unit PU may for instance compute when it will reach or has reached a position where too few signals can be received directly (i.e. without multi-path distortion) from satellites SA1, SA2, SA3 in order to compute a position with enough accuracy. In order to do this, the processor unit PU is arranged to compute which satellites do not suffer multi-path distortion, and which satellites do suffer multi-path distortion. This computation is explained in more detail below. Based on the outcome, the processor unit PU may decide to switch from the first mode to the second mode, in which the relative positioning system RPS is more emphasized.

Again the processor unit PU has knowledge of the current positions of the satellites SA1, SA2 from which signals are received (with or without multi-path distortion), as this information is comprised by the signals (orbital information). Using this information in combination with the shape and size of geographical objects close to the latest determined position, which is stored in the 3-dimensional digital map database 3DMD, the processor unit PU can compute from which satellites signals can be received without multi-path distortion by applying straightforward geometry.

So, according to this embodiment, the positioning device PD can predict, based on information from the 3D digital map database 3DMD that it will reach a position in which it is advantageous to be in a certain mode (first mode or second mode). In response to this, the positioning device PD may switch mode when this position is about to be reached or has been reached.

Determining Quality of the Signals

As described above, the processor unit PU may be arranged to determine which satellites SA1 are visible and which satellites SA3 are invisible or which satellites SA2 may suffer multi-path distortion. The processor unit PU can compute this using information about:

a) position of positioning device PD,
b) position of the respective satellite, and
c) 3D digital map database 3DMD.

The position of the positioning device PD used for computing which satellites SA1, SA2, SA3 are visible, invisible or suffer multipath distortion is the most recent position determined by the positioning device PD, for instance in a previous position determination. The position may also be an estimated position, i.e. a position that is estimated to be reached in one second. This may be done based on extrapolation of the velocity and direction of movement, possibly in combination with map matching techniques and using information about the planned route.

The position of the respective satellite SA1, SA2 can be computed based on the orbital information as received from the respective satellite SA1, SA2. Using this information, an elevation angle $\alpha$ can be computed, which indicates under which angle the respective satellite SA1, SA2 can be seen with respect to the horizontal. It can also be determined in which direction $\beta$ the respective satellite SA1, SA2 can be seen, for instance in a westerly direction (270° with respect to the northern direction).

The 3D digital map database 3DMD is taken from a memory, data carrier etc. as described above.

All this information can be used to compute whether or not direct communication between the positioning device PD and the satellite SA1, SA2 is possible and whether or not multi-path distortion may occur using basic goniometric mathematics. It will be understood that in case the positioning system is a terrestrial system, the positions of the transmitters may be fixed and may be known by the positioning device PD. In that case, their positions only need to be determined once, and not repeatedly.

Also, the surface properties of the objects stored in the 3D digital map database 3DMD (e.g. buildings) may be comprised in the 3D digital map database and used to decide upon the expected intensity of multi paths.

Based on this computation, a measure for the quality of the absolute position as determined by the absolute positioning system APS can be computed and compared to a threshold quality. If the quality of the absolute position as determined by the absolute positioning system APS is below the threshold quality, the position device PD may switch from first to second mode. If in second mode and the quality of the absolute position as determined by the absolute positioning system APS is above the threshold quality, the position device PD may switch from second to first mode.

The quality of the absolute positioning system APS may be determined by taking into account the number of satellites from which direct signals may be received, their angle above the horizon (low angled satellites usually provide relatively low quality information), their spatial distribution over the sky.

This information may be used to switch from first mode to second mode before the quality or accuracy of the position determined by the first mode is likely to have decreased too much, e.g. has decreased below a predetermined threshold. Also, this information may be used to switch from second mode to first mode when possible.

Flow Diagram 2

Figure 4:
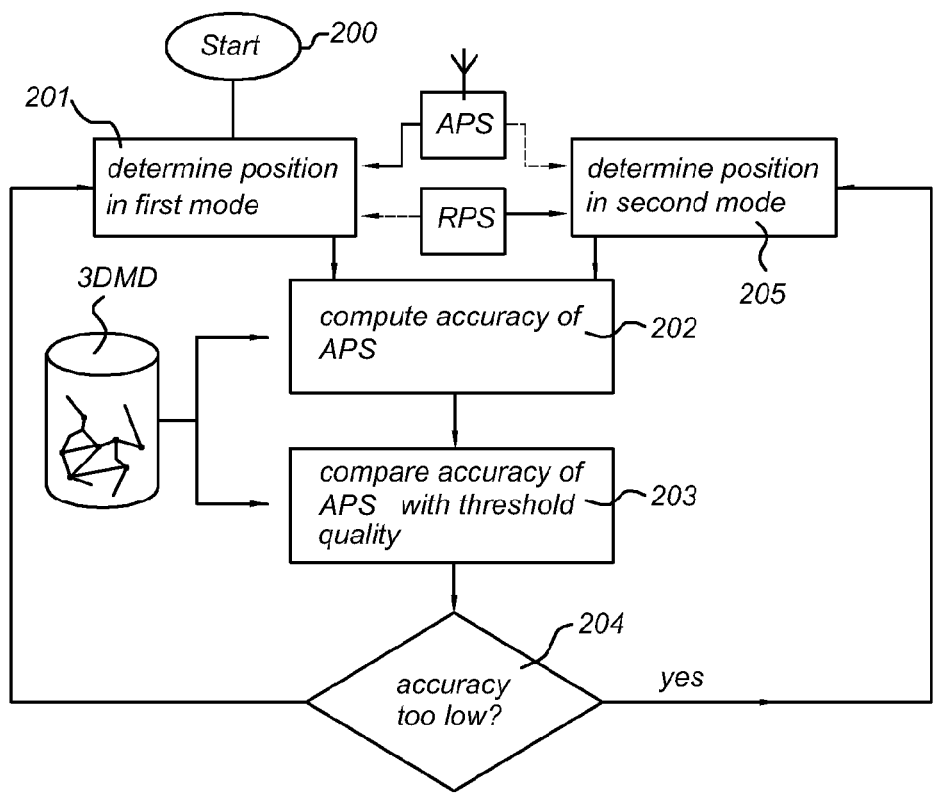

FIG. 4 schematically depicts a flow diagram depicting actions as may be performed by the positioning device PD or the processing unit PU according to an embodiment.

In a first action 200, the positioning device PD may start executing the flow diagram as described here. The start may be triggered manually by a user or may for instance be triggered by switching on the positioning device PD.

In a second action 201, the positioning device PD determines its position in the first mode, as schematically depicted in FIG. 4.

Once a position is determined, the positioning device PD may compute the quality of the absolute positioning system APS for that position. This is done in an action 202. For performing this action, input from the 3-dimensional digital map database 3DMD of geographical objects is used, in combination with the positions of the satellites SA1, SA2 applying straightforward geometry.

In a next action 203, the computed quality of the position determined based on the absolute positioning system APS is compared to a threshold quality.

If the quality is high enough in action 204 it is decided to return to action 201 and determine an updated position in the first mode. If the quality is too low, in action 204 it is decided to proceed to action 205 and determine an updated position in the second mode.

After action 201 and 205, actions 202, 203 and 204 are executed. This ensures that the positioning device PD automatically switches from the first mode to the second mode and vice versa when necessary and possible.

Embodiment 3

According to a further embodiment, the positioning device PD may be arranged to keep a history file comprising the determined positions and associated accuracies as determined according to the absolute positioning system APS as well as the measurements determined by the relative positioning system RPS.

For instance, the positioning device PD may be arranged to keep a history file over a certain distance, e.g. the last 200 meters. Or, the positioning device PD may be arranged to keep a history file during a certain time interval, e.g. the last minute.

This history file may be used when switching from the first mode to the second mode. Since the second mode more heavily relies on information from the relative positioning system RPS, the accuracy thereof heavily depends on the position that is used as starting position for the relative positioning system RPS.

When switching from the first mode to the second mode, the positioning device PD may be arranged to check the history file and select, based on information comprised by the history file, which position is to be used as starting position for the second mode.

For instance, in case the accuracy of a first position determined 50 meters before the switch has a very high accuracy and a second position determined close to the switch (e.g. 5 meters) has a very low accuracy, it may be more accurate to use the first position as a starting position and not the second position, although this second position is much closer to the position of the switch from first to second mode.

In order to use this first position as a starting position, it is necessary for the positioning device PD to also have stored the measurements of the relative positioning system RPS in between the first position and the position of the switch, to be able to compute further positions in the second mode.

It will be understood that the positioning device PD may be arranged to only keep a history file if a geographical object that may result in a switch is approached. The positioning device PD may compute if such a geographical object is approached based on extrapolation of velocity and direction or based on a planned route.

Flow Diagram 3

Figure 5:
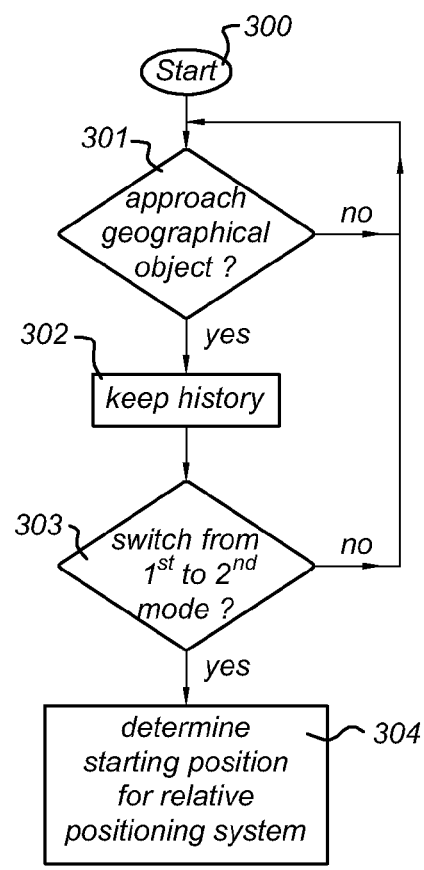

FIG. 5 schematically depicts a flow diagram that may be performed by the positioning device PD to perform the embodiment described here.

In a first action 300 the flow diagram is started. In a next action 301 it is determined if a geographical object is approached that may cause a switch between modes. If not, the positioning device PD returns to action 301. If so, the positioning device PD starts keeping a history file in action 302.

In action 303 it is determined if the positioning device PD switches from first mode to second mode. If no switch is made within a predetermined time interval or travelling distance, the positioning device PD returns to action 303.

If a switch is made from first to second mode, in action 304 the positioning device PD determines what the best starting position is for the relative positioning system RPS.

Embodiment 4

As described above, the geographical objects may be used to decide when to switch between first and second mode. These geographical objects may correspond to a real-life object that may influence the absolute positioning system APS, such as a tunnel, building, tree, hill etc.

The geographical objects (also referred to as geographical points) may also be a position of which it is known that one mode is to be preferred above the other, and the position does not necessarily correspond to or is linked to a real-life object such as a tunnel, building, tree, hill etc.

According to an embodiment, the positioning device PD is arranged to add geographical objects to the digital map database DMD based on measurements by the absolute and relative positioning system and associated accuracies in the past. According to such an embodiment, the positioning device PD is arranged to compute and log the accuracies of determined positions and the mode in which the positions were determined.

If it is detected that the accuracy of a determined position or range of positions (e.g. in a tunnel), for instance in the first mode, is below a certain threshold, this position may be stored as a geographical object, with an advised mode (e.g. the second mode) associated with it. The positioning device PD may also be arranged to store such a position as a geographical object with an advised mode assigned to it, only if the determined accuracy of the determined position in one mode is below the threshold more than a predetermined number of times (e.g. 5 times) or more than a predetermined percentage of time (e.g. more than 50% of the cases the position is determined).

This embodiment provides a self-teaching positioning device PD that may add positions to the digital map database DMD or three dimensional digital map database 3DMD of which it is known based on previous measurements that determining a position in a certain mode will most likely result in a relatively low accuracy, and the positioning device PD may therefore switch to another mode before such a position is reached. This may result in more accurate positioning.

The measured accuracy information can be linked to the digital map database DMD/3DMD and fed back to a map provider to be included in newer generations of the digital map database DMD/3DMD or broadcasted to a service provider to be distributed back to new users. Also, the information can be broadcasted directly to users in the vicinity to be shared between drivers. So, other drivers which are not aware of future drop outs of absolute position systems (tunnels, power lines) can learn about this and take necessary precautions: switch to the second mode.

The information can be put back in the digital map database DMD by a map provider or be distributed on the fly to a service centre who then distributes it to other drivers. Also, this information can be broadcasted directly to vehicles in the neighbourhood who may store the information in their local digital map database DMD for further use as described above.

Further Remarks

In both embodiments described above, switching from the first mode to the second mode, and vice versa, is decided based on a previously determined position in combination with information stored in the digital map database. According to an embodiment, also information about the position of satellites may be used.

It will be understood that although the embodiments above describe a positioning device PD using a first and second mode, the positioning device PD may further be arranged to work in further modes, such as a third, fourth etc. mode. In these further modes, the weighting of the absolute and relative positioning systems may be different than in the first and second modes. Also, modes may be different in that a different set of relative positioning systems RPS are used. For instance, in the second mode, the positioning device PD may use a compass and a velocity meter, where in the third mode, also an accelerometer is used. It will be understood that all kinds of variations are possible.

Therefore, it will be understood that the positioning device PD may also be arranged to switch between the first, second and further modes based on the determined position in combination with information stored in the digital map database (DMD, 3DMD). Geographical objects may also have an advised mode associated with them, indicating to which mode the positioning device PD is to switch when approaching such a geographical object.

The information stored in the digital map database DMD, 3DMD that triggers the switch from first to second mode or vice versa, may also comprise a time parameter, indicating that the switch should only be made at certain moments in time. For instance, the presence of leaves on trees may block receipt of signals for use by the absolute positioning system APS only from spring to autumn, or from spring to summer.

It will be understood that although the above embodiment are presented as separate embodiment, combinations may be employed to practice.

It will be understood that the embodiments as described here may be provided as a computer program that, when loaded on a computer arrangement, is arranged to perform any one of the embodiments described above. Such a computer program may be provided on a data carrier, such as a computer readable medium, e.g. a floppy disk, a memory card, a CD, a DVD, etc.

For the purpose of teaching the invention, preferred embodiments of the method and devices of the invention were described. It will be apparent for the person skilled in the art that other alternative and equivalent embodiments of the invention can be conceived and reduced to practice without departing from the true spirit of the invention, the scope of the invention being only limited by the annexed claims.

The invention claimed is:

1. A positioning device comprising:
   an absolute positioning system and a relative positioning system;
   a memory, wherein the memory stores a history file comprising: a plurality of positions previously determined by the absolute positioning system and an associated accuracy for each of the plurality of determined positions; and measurements determined by the relative positioning system;
   a processor unit, wherein said processor unit is operable to determine a position using the absolute positioning system and the relative positioning system, the positioning device being configured to work in a first mode, in which the position is determined using the absolute position system, and a second mode, in which the position is determined using the relative positioning system in combination with a starting position determined by the absolute positioning system, and the positioning device being configured to switch from the first mode to the second mode, wherein, when a switch is made from the first mode to the second mode, the processor unit is further arranged to check the history file and to select one of the plurality of positions determined by the absolute positioning system as the starting position for the relative positioning system based on the accuracy information stored in the history file.

2. The positioning device according to claim 1, wherein the processor unit is arranged to keep the history file for over a predetermined distance, such that the history file comprises a plurality of positions previously determined by the absolute positioning system over the predetermined distance.

3. The positioning device according to claim 1, wherein the processor unit is arranged to keep the history file for a predetermined time interval, such that the history file comprises a plurality of positions previously determined by the absolute positioning system over the predetermined time interval.

4. The positioning device according to claim 1, wherein the memory further stores a digital map database comprising a plurality of geographical objects, and wherein the processor unit is arranged to keep the history file only if a stored geographical object is being approached that may result in the switch is from the first mode to the second mode.

5. The positioning device according to claim 4, wherein the device is configured to compute if said geographical object is approached based on extrapolation of velocity and direction or based on a planned route.

6. The positioning device according to claim 1, wherein the absolute positioning system is one of a satellite based positioning system and a terrestrial positioning system.

7. The positioning device according to claim 6, wherein the relative positioning system is at least one of a gyroscope, an accelerometer, a compass, a velocity measurement module, a distance meter, an inclinometer and a module to detect steering actions of a steering wheel.

8. The positioning device according to claim 1, wherein the relative positioning system is at least one of a gyroscope, an accelerometer, a compass, a velocity measurement module, a distance meter, an inclinometer and a module to detect steering actions of a steering wheel.

9. A method for determining a position using a positioning device comprising an absolute positioning system and a relative positioning system, the positioning device being configured to work in a first mode, in which the position is determined using the absolute position system, and a second mode, in which the position is determined using the relative positioning system in combination with a starting position determined by the absolute positioning system, the method comprising:
switching from the first mode to the second mode; and
keeping a history file, the history file comprising: a plurality of positions previously determined by the absolute positioning system and an associated accuracy for each of the plurality of determined positioned; and measurements determined by the relative positioning system,
wherein, when the switch is made from the first mode to the second mode, checking the history file and selecting one of the plurality of positions determined by the absolute positioning system as the starting position for the relative positioning system based on the accuracy information stored in the history file.

10. The method according to claim 9, wherein the absolute positioning system is one of a satellite based positioning system and terrestrial positioning system.

11. The method according to claim 10, wherein the absolute positioning system is configured to determine the position based on signals received from a plurality of transmitters being part of the satellite based positioning system or the terrestrial positioning system.

12. The method according to claim 9, wherein the relative positioning system is at least one of a gyroscope, an accelerometer, a compass, a velocity measurement module, a distance meter, a module to detect steering actions of a steering wheel, and an inclinometer.

13. The method according to claim 9, wherein the history file is kept for a predetermined distance, such that the history file comprises a plurality of positions previously determined by the absolute positioning system over the predetermined distance.

14. The method according to claim 9, wherein the history file is kept for a predetermined time interval, such that the history file comprises a plurality of positions previously determined by the absolute positioning system over the predetermined time interval.

15. The method according to claim 9, comprising:
accessing a digital map database comprising a plurality of geographical objects; and
keeping the history file only if a geographical object that may result in a switch from the first mode to the second mode is approached.

16. The method according to claim 15, comprising computing whether said geographical object is approached based on extrapolation of velocity and direction or based on a planned route.

17. A non-transitory computer readable medium comprising program segments which, when executed on a computer device, perform the method of claim 9.

18. The positioning device according to claim 1, wherein the memory further stores a digital map database comprising a plurality of geographical objects having threshold distances associated therewith, and wherein the processor unit is arranged to compute at least one distance from the determined position to a selection of the plurality of geographical objects, and to make the switch from the first mode to the second mode if at least one of the computed distance is below the respective associated threshold.

19. The method according to claim 9, comprising:
accessing a digital map database comprising a plurality of geographical objects having threshold distances associated therewith;
computing at least one distance from the determined position to a selection of the plurality of geographical objects; and
switching from the first to the second mode is made if at least one of the computed distances is below the respective associated threshold.

* * * * *